United States Patent
Zhang

(10) Patent No.: US 8,798,210 B2
(45) Date of Patent: Aug. 5, 2014

(54) METHOD, APPARATUS AND SYSTEM FOR CARRIER FREQUENCY OFFSET ESTIMATION

(75) Inventor: Yun Zhang, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 192 days.

(21) Appl. No.: 13/597,204

(22) Filed: Aug. 28, 2012

(65) Prior Publication Data

US 2013/0272452 A1 Oct. 17, 2013

(30) Foreign Application Priority Data

Apr. 13, 2012 (CN) .......................... 2012 1 0109978

(51) Int. Cl.
*H04L 27/06* (2006.01)
*H03D 1/00* (2006.01)

(52) U.S. Cl.
USPC ........... 375/343; 375/142; 375/316; 714/792; 714/794; 714/796

(58) Field of Classification Search
USPC ........... 375/142, 316, 343; 714/792, 794, 796
See application file for complete search history.

(56) References Cited

U.S. PATENT DOCUMENTS

| | | | | |
|---|---|---|---|---|
| 2004/0052306 | A1* | 3/2004 | Ibrahim et al. | 375/152 |
| 2004/0165687 | A1* | 8/2004 | Webster et al. | 375/350 |
| 2009/0110033 | A1* | 4/2009 | Shattil | 375/141 |
| 2009/0185649 | A1* | 7/2009 | Webster et al. | 375/346 |

* cited by examiner

*Primary Examiner* — Ted Wang
(74) *Attorney, Agent, or Firm* — Blakely Sokoloff Taylor & Zafman

(57) ABSTRACT

Methods, system and apparatuses for carrier frequency offset estimation are disclosed. The method includes: receiving a preamble sequence $r_n$ with a correlator and correlating the preamble sequence with a locally stored Barker code $b_n$ to obtain a correlation result $c_n$; extracting peak values from every L points in $c_n$ to form a peak value sequence $x_n$, L being a length of a Barker code that corresponds to the sampling rate; performing frequency offset estimation to $x_n$ by using at least two frequency offset estimation apparatuses, the at least two frequency offset estimation apparatuses adopting different delay parameters D; and inputting the results output from the at least two frequency offset estimation apparatuses into a frequency offset combination module to calculate a final carrier frequency offset estimate, whereby accurate frequency estimation can be achieved and an appropriate acquisition range of frequency offset can be ensured.

7 Claims, 3 Drawing Sheets

METHOD, APPARATUS AND SYSTEM FOR CARRIER FREQUENCY OFFSET ESTIMATION

CROSS-REFERENCE TO RELATED APPLICATION

This application claims the priority of Chinese patent application number 201210109978.2, filed on Apr. 13, 2012, the entire contents of which are incorporated herein by reference.

TECHNICAL FIELD

The present invention relates to communications field, and more particularly, to a method, apparatus and system for carrier frequency offset estimation.

BACKGROUND

A frame in 802.11b wireless LAN system is composed of a preamble sequence, a frame header sequence and a data sequence. As data are transmitted in a burst manner in a wireless LAN, a receiver must complete all synchronization processes during the period of receiving the preamble sequence, and carrier frequency estimation is the most important step therein. According to the provision of the wireless LAN standard that crystal oscillator stability shall be controlled within the range of ±25 ppm, the maximum permissible carrier frequency offset for a receiver can be calculated as to be ±125 KHz.

802.11b wireless LANs are required to be able to normally operate in extreme environments, for example, it is required to achieve stable and reliable transmission at a signal-to-noise ratio (SNR) of less than 0 dB under the 1 Mbps mode. Thus, carrier frequency estimation is required to ensure both a high accuracy at an SNR of less than 0 dB and a sufficient estimation range.

In a general case, a 802.11b wireless LAN adopts a delayed correlation method to directly obtain rough estimates of carrier frequency offset. Performance of this method depends on the length of delay. Specifically, a small delay results in a wide estimation range and a poor estimation accuracy; and conversely, a greater delay leads to a higher accuracy and a narrower estimation range though due to phase ambiguity issues.

SUMMARY OF THE INVENTION

Many aspects of present disclosure provides a method, apparatus and system for carrier frequency offset estimation to solve the problem encountered by the prior art that a high accuracy and a wide acquisition range cannot be obtained at the same time in carrier frequency offset estimation.

One aspect of present disclosure provides a method for carrier frequency offset estimation, which includes:

receiving, by a correlator, a preamble sequence $r_n$, and correlating the preamble sequence $r_n$ with a locally stored Barker code $b_n$ to obtain a calculation result $c_n$;

extracting peak values from every L points in $c_n$ to form a sequence $x_n$, L being a length of a Barker code that corresponds to a sampling rate;

performing frequency offset estimation to $x_n$ through at least two frequency offset estimation apparatuses to obtain corresponding frequency offset estimates, the at least two frequency offset estimation apparatuses adopting different delay parameters D; and inputting the results output from the at least two frequency offset estimation apparatuses into a frequency offset combination module to calculate a final carrier frequency offset estimate.

Another aspect of present disclosure provides a system for carrier frequency offset estimation, which includes:

a correlator, a peak value extraction module, a first frequency offset estimation module, a second frequency offset estimation module and a frequency offset combination module, wherein the correlator is configured to receive a preamble sequence $r_n$, and correlate the preamble sequence $r_n$ with a locally stored Barker code $b_n$ to obtain a calculation result $c_n$;

the peak value extraction module is configured to extract peak values from every L points in $c_n$ and form a peak value sequence $x_n$, L being a length of a Barker code that corresponds to the sampling rate;

the first frequency offset estimation module is configured to receive $x_n$ and calculate a corresponding carrier frequency offset estimate;

the second frequency offset estimation module is configured to receive $x_n$ and calculate another corresponding carrier frequency offset estimate;

the frequency offset combination module is configured to receive output from the first frequency offset estimation module and the second frequency offset estimation module, and calculate a final carrier frequency offset estimate, wherein the first and second frequency offset estimation modules adopt different delay parameters D.

Another aspect of present disclosure provides an apparatus for carrier frequency offset estimation, which includes:

a time-delayed conjugate multiplication module, a sequence storage module, a determination-compensation module, an accumulator, a phase obtainment apparatus and a multiplication module, wherein the time-delayed conjugate multiplication module is configured to perform a time-delayed conjugate multiplication to $x_n$ to obtain a sequence $y_n$ and store the sequence $y_n$ on the sequence storage module;

the sequence storage module is configured to receive the sequence $y_n$ from the time-delayed conjugate multiplication module and store it;

the determination-compensation module is configured to determine sequences stored on the sequence storage module and compensate phases thereof;

the accumulator is configured to accumulate the determination-compensation results and average them;

the phase obtainment apparatus is configured to receive outputs from the accumulator to obtain a phase and adjust the phase into a range of $(-\pi/2, \pi/2)$ by adding or subtracting $\pi$ thereto or therefrom; and the multiplication module is configured to multiply the phase with $K_i$ to obtain a carrier frequency offset estimate and output the carrier frequency offset estimate by a corresponding carrier frequency offset estimation apparatus, where $K_i=F_s/(2\pi D_i)$; $F_s$ is the rate of the preamble; and $D_i$ is the delay parameter of the i-th frequency offset estimation apparatus.

By incorporating at least two tiers of carrier frequency offset estimation, including at least one tier for ensuring a high estimation accuracy, and at least another tier for ensuring an appropriate acquisition range of frequency offset, into the method, apparatus and system for carrier frequency offset estimation of the present disclosure, correctness and reliability in carrier frequency offset estimation results are both guaranteed.

DETAILED DESCRIPTION

To clarify the present disclosure, the following description and the accompanying drawings illustrate the embodiments of the present disclosure.

Figure 1:
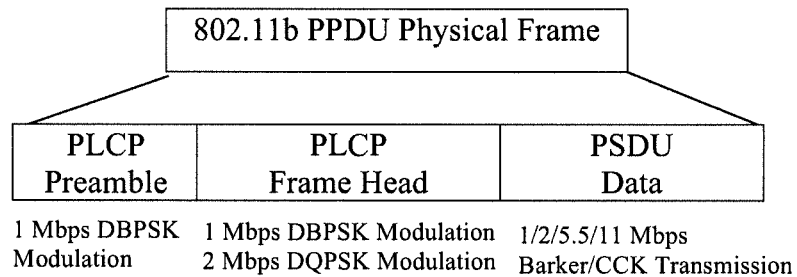
FIG. 1 is a diagram illustrating structure of an 802.11b physical layer transmission frame.

That will be introduced first is an application field of the present disclosure, the wireless LANs. Shown in FIG. 1 is the frame structure of a 802.11b wireless LAN system. The frame mainly includes a preamble sequence, a frame header sequence and a data sequence. The preamble sequence is transmitted at 1 Mbps using differential binary phase shift keying (DBPSK) modulation and Barker code based spectrum spreading, followed by the frame header sequence, which may be transmitted at 1 Mbps using DBPSK modulation and Barker code based spectrum spreading, or at 2 Mbps using differential quadrature phase shift keying (DQPSK) modulation and Barker code based spectrum spreading. The portion of effective data may be transmitted either at 1 Mbps, 2 Mbps, 5.5 Mbps or 11 Mbps.

In 802.11b systems, carrier recovery is often completed during the period of receiving the preamble. There are two kinds of preambles. The first one is referred to as the short preamble and the second one is referred to as the long preamble. Duration of the long and short preamble is 144 µs and 72 µs, corresponding to 144 and 72 preamble bits, respectively. Further, preamble bit is composed of synchronous bit and check bit. Synchronous bit of a long preamble consists of 128 consecutive 1's, while that of a short preamble consists of 56 consecutive 0's. The length of check bit is 16 and check bits of a long and short preamble are different with each other. A receiver reads the check bit to find whether the end of the current preamble is reached and whether the current preamble is a long or a short one. All the synchronous bits pass through scrambling modules such that any long string of consecutive 0' or 1' is eliminated. After that, the synchronous bit is modulated according to the DBPSK modulation table (referring to Table 1) to generate a preamble symbol which has the same length with the synchronous bit. Subsequently, each preamble symbol is spread with an 11-bit Barker code and is transmitted thereafter. In such a way, after the Barker code based spectrum spreading, preamble sequences transmitted at a rate of 11 Mbps are obtained from preamble data transmitted at a rate of 1 Mbps.

TABLE 1

| DBPSK Modulation Table | | |
|---|---|---|
| Input Bit | 0 | 1 |
| Phase Change | 0 | π |

A receiver needs Barker codes that have good auto-correlation to obtain a de-spreading gain such that it can still determine the timing synchronization position even when signals are extremely weak. As each Barker code contains 11 code chips, a Barker code correlator will output a peak value in each 11 points at the baseband data rate. As carrier frequency offsets cause phase changes of these peak values, they can be estimated by performing a differentiation operation on the phase changes.

Embodiment 1

This embodiment of the present disclosure provides a method for carrier frequency offset estimation, which includes following steps 101, 103, 105 and 107.

Step 101: A correlator receives a preamble sequence $r_n$, and correlates it with a Barker code $b_n$ to obtain a result $c_n$.

In this embodiment, the Barker code $b_n$ may be locally stored on the correlator. The received preamble sequence may be a baseband signal or an oversampling signal. Although the number of sampling points between every two peaks of the correlation sequence $c_n$ is related to the sampling rate, as the transmission rate $F_s$ of each preamble is invariably 1 MHz, i.e., peaks of the correlation sequence $c_n$ repeatedly appear at a rate of 1 MHz, the sampling interval $T_s$ that corresponds to the peak positions will be $1/F_s$. If a received preamble sequence is denoted as $r_n$ and a local Barker code is denoted as $b_n$, the correlation can be performed on them according to the formula $$c_n = \sum_{k=0}^{L-1} b_k r_{n+k},$$

where L is the length of the barker code and it corresponds to the sampling rate. As the length of the original Barker code is invariably 11, if the sampling rate is equal to the baseband rate, namely, 11 Mbps, $b_n$ is exactly the original Barker code and L is equal to 11; if the sampling rate is equal to two times of the baseband rate, namely, 22 Mbps, $b_n$ is obtained by inserting one zero after every element of the original Barker code and L will be equal to 22; . . . ; and so on.

Step 103: extract peak values every L points in $c_n$ and form a peak value sequence $x_n$, wherein L is the length of the Barker code and it corresponds to the sampling rate.

Step 105: perform frequency offset estimation to $x_n$ through at least two frequency offset estimation apparatuses to obtain corresponding frequency offset estimates, wherein the delay parameters D in the at least two frequency offset estimation apparatuses are different.

In this embodiment, for each frequency offset estimation apparatus, a new sequence $y_n$ obtained through delaying an incoming sequence $x_n$ by D sampling points and then conjugate multiplying $x_n$ with the delayed one can be regarded as a sequence that has been modulated by a binary phase shift keying (BPSK) sequence $q_n$ and contains carrier frequency offset information, as indicated by the following formula (1), $$x_n = s_n * e^{j(2\pi n f \Delta T_s + \theta)}$$

$$x_{n+D} = s_{n+D} * e^{j(2\pi (n+D) f \Delta T_s + \theta)}$$

$$y_n = x_{n+D} \bar{x}_n = q_n * e^{(j2\pi D f \Delta T_s)} \quad (1)$$

where, $x_{n+D}$ is the D points delayed peak value sequence; $s_n$ is the transmitted preamble sequence; $q_n = s_{n+D} \bar{s}_n$ is referred to as a modulation sequence, and the value of it may be +1 or −1 for a 802.11b system; $f_\Delta$ is the carrier frequency offset; $\theta$ is the carrier phase; $T_s$ is the sampling interval and $T_s=1/F_s$; and $F_s$ is the transmission rate of preamble symbols and $F_s=1$ MHz.

According to formula (1), it is clear that once the compensation sequence $\hat{q}_n$ of the modulation sequence $q_n$ is available, estimates of carrier frequency offset can be obtained according to following formula (2), $$z_n = y_n \hat{q}_n = q_n \hat{q}_n * e^{(j2\pi D f_\Delta T_s)}$$

$$f_\Delta = \text{angle}(z_n) * F_s/(2\pi D) \qquad (2)$$

where, angle(·) stands for the function of obtaining a phase. The function is also adopted by the phase obtainment apparatus for phase obtainment.

In the formula, if the absolute phase of each element of the modulation sequence $q_n$ is accurately compensated, i.e., the sequence obtained by multiplying sequences $\hat{q}_n$ and $q_n$ together is a positive real number sequence, the sequence $z_n$ will contain frequency offset information solely. Values of its phases may be within the range of $(-\pi,\pi)$, and the corresponding carrier frequency offset acquisition range will be obtained as $$|f_\Delta| < \frac{F_s}{2D}(F_s = 1/T_s),$$

where as there is a phase ambiguity of $2\pi$, a corresponding ambiguity of $$\frac{F_s}{2D}$$

will be generated in frequency.

Nevertheless, for an 802.11b system, the modulation sequence $q_n$ cannot be accurately estimated, and what is known about it is that its value may not be anything else but +1 or −1. In this respect, we could only compensate relative phases among elements of the modulation sequence $q_n$. The sequence $z_n$, which is compensated by using the sequence $\hat{q}_n$, will contain a common multiplicative factor of +1 or −1. Accordingly, we need to adjust phases of the sequence $z_n$ into an appropriate range, namely, to limit their values into the range of $(-\pi/2,\pi/2)$ by adding $\pi$ to or subtracting $\pi$ from those out of the range so as to narrow the carrier frequency offset acquisition range to $$|f_\Delta| < \frac{F_s}{2D}(F_s = 1/T_s).$$

Similarly, in this case, there exists a frequency ambiguity of $$\frac{F_s}{2D}$$

that is caused by the phase ambiguity of $\pi$.

Following Table 2 shows ranges of carrier frequency offset estimation and frequency ambiguities for various delay parameters D in an 802.11b system.

TABLE 2

| Value of Delay D/ Maximum Acquisition Range of Frequency Offset | Maximum Estimable Carrier Frequency Offset | Frequency Ambiguity |
|---|---|---|
| D = 1 | ±250 KHz | 500 KHz |
| D = 2 | ±125 KHz | 250 KHz |
| D = 4 | ±62.5 KHz | 125 KHz |
| D = 10 | ±25 KHz | 50 KHz |
| D = 20 | ±12.5 KHz | |

Figure 2:
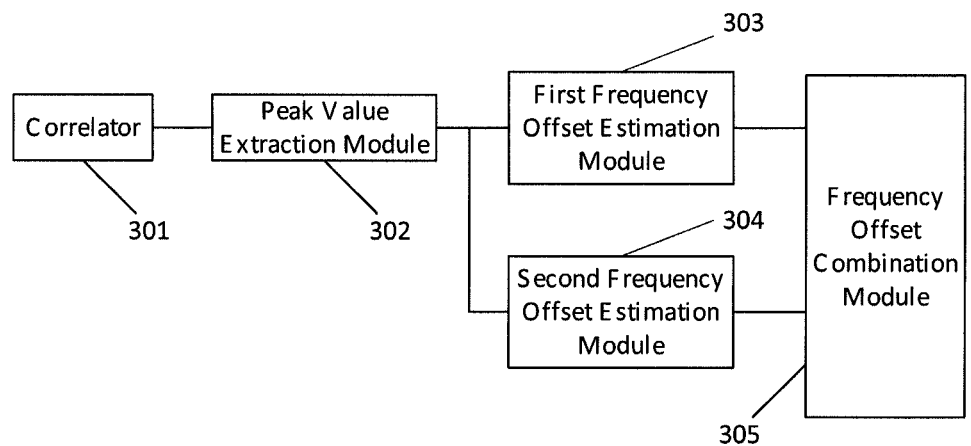
FIG. 2 is a schematic illustration of a system for carrier frequency offset estimation according to one embodiment of the present disclosure.

It could be easily found from Table 2 that the delay parameter D determines both the maximum acquisition range of carrier frequency offset and carrier frequency offset estimation accuracy. As indicated in FIG. 2, this embodiment proposes to balance acquisition range and estimation accuracy by using a series of delay parameters D.

For a series of frequency offset modules from 1 to N having different delay parameters, if we mark the delay parameter of the i-th frequency offset module as $D_i$ (i=1, 2, . . . , N), and assume without loss of generality that the delay parameters increase in order, then we will get $D_1 < D_2 < \ldots < D_N$.

Figure 3:
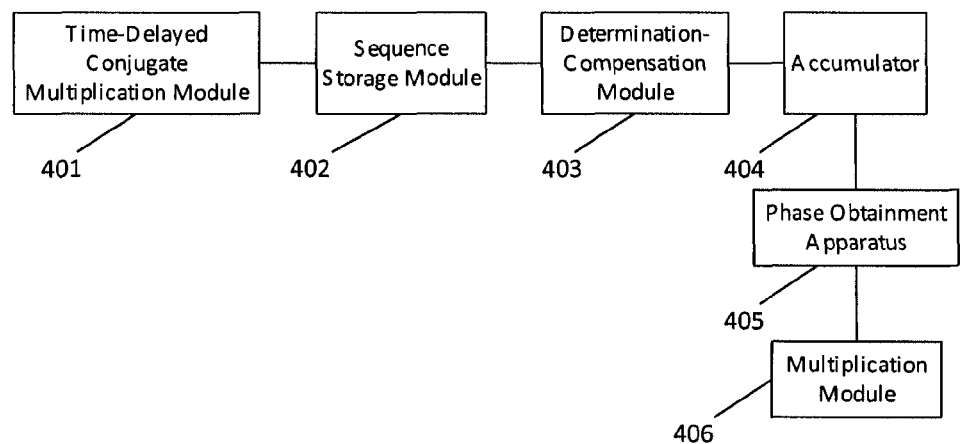
FIG. 3 is a schematic illustration of an apparatus for carrier frequency offset estimation according to one embodiment of the present disclosure.

Structure of a carrier frequency offset estimation apparatus i is shown in FIG. 3. Each carrier frequency offset estimation apparatus obtains an estimate of carrier frequency offset based on its own delay parameter $D_i$ (i=1, 2, . . . , N), according to following steps S1 to S4:

S1: perform a time-delayed conjugate multiplication to $x_n$ and store the multiplication result $y_n$ on a sequence storage module;

S2: determine sequences stored on the sequence storage module and compensate phases thereof, which further includes:

obtain components $$\sum_n |I_n|^2 \text{ and } \sum_n |Q_n|^2$$

from calculating energies of sequences $I_n$ and $Q_n$ which are real and imaginary parts of $y_n$, and perform a symbol determination based on the component that has a greater energy so as to obtain a determined modulation sequence, $$\hat{q}_n = \begin{cases} \text{sign}(I_n) & \text{if } \sum_n |I_n|^2 > \sum_n |Q_n|^2 \\ \text{sign}(Q_n) & \text{if } \sum_n |I_n|^2 \leq \sum_n |Q_n|^2, \end{cases}$$

where, sign(·) stands for a sign function; and obtain a compensated sequence by multiplying the sequence $y_n$ with the determined sequence $\hat{q}_n$.

S3: accumulate the determined and compensated sequences and average them, output the results to a phase obtainment apparatus to obtain a phase, and adjust the phase into the range of $(-\pi/2,\pi/2)$ by adding or subtracting $\pi$ thereto or therefrom; and S4: multiply the phase with $K_i$ to obtain a carrier frequency offset estimate to be output by the corresponding carrier frequency offset estimation apparatus, where $K_i = F_s/(2\pi D_i)$, $F_s$ is the rate of the preamble symbol, and $D_i$ is the delay parameter of the i-th frequency offset estimation apparatus.

Step 107: input results output from the at least two frequency offset estimation apparatuses into a frequency offset combination module to calculate a final carrier frequency offset estimate, wherein if the total number of frequency offset estimation apparatuses is N and the delay parameter of the N-th frequency offset estimation apparatus is greater than that of the (N−1)-th frequency offset estimation apparatus, the carrier frequency offset estimate is calculated by formula $F=F_N+Idx*F_{M,N}$, wherein $Idx=round((F_{N-1}-F_N)/F_{M,N})$; round(·) stands for a round function; $F_N$ is the carrier frequency offset estimate output by the N-th frequency offset estimation apparatus; $F_{N-1}$ is the carrier frequency offset estimate output by the (N−1)-th frequency offset estimation apparatus; and $F_{M,N}$ is the frequency ambiguity of the N-th frequency offset estimation apparatus;

if there is no other frequency offset estimation apparatus, F will be the final carrier frequency offset estimate; and if there exists one or more frequency offset estimation apparatuses having an order number smaller than N−1, namely the (N−2)-th frequency offset estimation apparatus, the (N−3)-th frequency offset estimation apparatus and so on, F will be regarded as an accurately calibrated estimate $F_{N-1}$ of the (N−1)-th frequency offset estimation apparatus and will be further processed with the estimate $F_{N-2}$ of the (N−2)-th frequency offset estimation apparatus according to the above formulae; the above process will be repeated until the frequency offset estimation apparatus with the smallest order number is reached, and the correspondingly obtained carrier frequency offset estimate F will be regarded as the final carrier frequency offset estimate.

In this embodiment, the frequency offset combination module is capable of obtaining an optimal carrier frequency offset estimate based on the results output from the plurality of frequency offset estimation apparatuses. As for the delay parameter $D_i$ (i=1, 2, . . . , N), the existence of the phase ambiguity causes a frequency ambiguity of $$\frac{F_s}{2D_i},$$

from which it could be easily found that, a greater $D_i$ will lead to a more serious frequency ambiguity and thus a narrower frequency offset estimable range, but on the other hand, it will also benefit us a higher estimation accuracy. Therefore, in the present disclosure, the final result of frequency offset estimation can be determined by repeating the process of obtaining multiple estimation results by successively increasing or reducing the frequency ambiguity of the current tier and taking the one therein which is closest to the final estimation result of the former tier as the final estimation result of the current tier, starting from the tier with highest accuracy, namely, the tier with greatest delay, until the tier with least delay is reached.

By incorporating at least two tiers of carrier frequency offset estimation, including at least one tier for ensuring a high estimation accuracy, and at least another tier for ensuring an appropriate acquisition range of frequency offset, into the carrier frequency offset estimation method of the present disclosure, correctness and reliability in carrier frequency offset estimation results are both guaranteed.

Embodiment 2

In this embodiment, two frequency offset estimation apparatuses, namely, two tiers of carrier frequency offset estimation, are incorporated.

Specifically, in the first tier, the delay parameter D is set to 1 so as to ensure an appropriate acquisition range of frequency offset, while in the second tier, the delay parameter D is set to 20 so as to increase the frequency offset estimation accuracy.

As for the first frequency offset estimation module of which the delay parameter is set to 1, from the fact that the maximum permissible frequency offset for 802.11b systems is ±125 KHz, it could be calculated that the maximum difference between two neighboring correlation peaks $x_{n+1}$ and $x_n$ is 45 degrees. Therefore, energy of the real part of the sequence $y_n$ is surely greater than that of the imagery part, and thus determination of modulation sequence can be directly performed based on the real part of the sequence $y_n$ so as to obtain a BPSK modulation sequence $\hat{q}_n=sign(real(y_n))$, where real(·) stands for the function of obtaining a phase, and sign(·) stands for the sign function. After that, a new sequence $z_n$ obtained by compensating with the modulation sequence $\hat{q}_n$ is accumulatively added and averaged to reduce the influence of noise therein. Subsequently, its phase is obtained to get the carrier frequency offset according to the above formula (2). The calculation result thereof is denoted as $f_c$KHz.

As for the second frequency offset estimation module of which the delay parameter is set to 20, as indicated by Table 1, only the frequency offset within the range of ±12.5 KHz is estimable and the corresponding frequency ambiguity therein is 25 KHz. As the maximum permissible frequency offset is ±125 KHz, there will always exist the issue of frequency ambiguity. For this tier, carrier frequency offset $f_c$KHz can be estimated by: performing determination of modulation sequence and phase compensation based on the real part or the imaginary part, which has a greater energy, of a sequence obtained by the delayed correlation method; accumulatively adding and averaging the compensated sequence to obtain a phase; and adjusting the phase into the range of $(-\pi/2,\pi/2)$ through adding or subtracting $\pi$ thereto or therefrom. In such manner, we can get that the actual frequency offset will be $(f_F+25*Idx)$KHz, where Idx is an integer.

Specifically, Idx will be the integer that makes $(f_F+25*Idx)$ KHz closest to $f_c$KHz.

Accordingly, in this embodiment, the finally output estimate of carrier frequency offset will be $(f_F+25*Idx)$KHz.

There are various available specific modulation sequence determination methods, and the one adopted in this embodiment includes:

obtain components $$\sum_n |I_n|^2 \text{ and } \sum_n |Q_n|^2$$

from calculating energies of sequences $I_n$ and $Q_n$ which are real and imaginary parts of $y_n$, and perform a symbol determination based on the component having a greater energy, so as to obtain a determined modulation sequence, $$\hat{q}_n = \begin{cases} sign(I_n) & \text{if } \sum_n |I_n|^2 > \sum_n |Q_n|^2 \\ sign(Q_n) & \text{if } \sum_n |I_n|^2 \le \sum_n |Q_n|^2, \end{cases}$$

where sign(·) stands for the sign function.

If more tiers of frequency offset estimation are adopted and the delay parameter for each tier is appropriately set, the estimation accuracy will be further improved. For example, three or more tiers of frequency offset estimation may be adopted and the delay parameter D for each tier may be determined according to practical needs. Different delay parameter settings will lead to different estimation accuracies and acquisition ranges.

Figure 4:
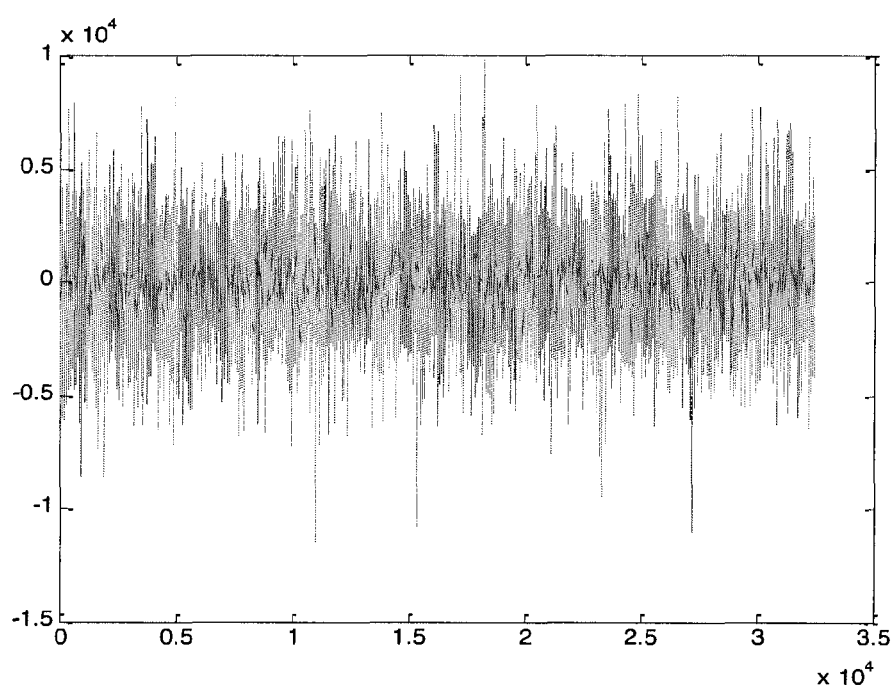
FIG. 4 is a diagram depicting of a residual carrier frequency offset estimated by a method of the prior art.
Figure 5:
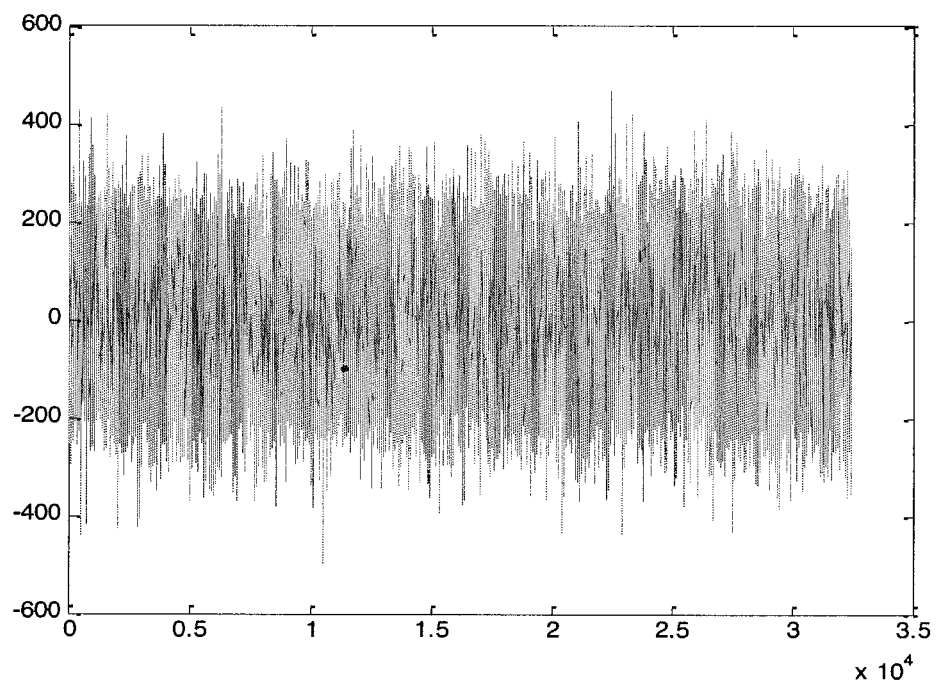
FIG. 5 is a diagram depicting of a residual carrier frequency offset estimated according to an embodiment of the present disclosure.

Results of full preamble sequence based residual carrier frequency offset estimation obtained by the prior art and the present invention for an environment of 0 dB SNR are shown in FIG. 4 and FIG. 5, respectively. As shown in FIG. 4, it is clear that the estimate of residual frequency offset obtained by the method of the prior art is greater than 10 KHz. In contrary, as shown in FIG. 5, the method of the embodiment of the present invention is capable of ensuring both an appropriate acquisition range and a higher acquisition accuracy. In FIG. 5 the estimated maximum residual frequency offset is less than 500 Hz, i.e., an estimation accuracy improvement of more than 20 times is achieved compared to that of the prior art.

Embodiment 3

This embodiment provides a system for carrier frequency offset estimation, which includes a correlator 301, a peak value extraction module 302, a first frequency offset estimation module 303, a second frequency offset estimation module 304 and a frequency offset combination module 305, wherein the correlator 301 is configured to receive a preamble sequence $r_n$, and correlate the preamble sequence $r_n$ with a locally stored Barker code $b_n$ to obtain a calculation result $c_n$;

the peak value extraction module 302 is configured to extract peak values from every L points in $c_n$ and form a peak value sequence $x_n$, L being a length of a Barker code that corresponds to the sampling rate;

the first frequency offset estimation module 303 is configured to receive $x_n$ and calculate a corresponding carrier frequency offset estimate;

the second frequency offset estimation module 304 is configured to receive $x_n$ and calculate another corresponding carrier frequency offset estimate;

the frequency offset combination module 305 is configured to receive the results output from the first frequency offset estimation module 303 and the second frequency offset estimation module 304 and calculate a final carrier frequency offset estimate; the first frequency offset estimation module 303 and the second frequency offset estimation module 304 adopt different delay parameters D.

In this embodiment, the first frequency offset estimation module 303 and the second frequency offset estimation module 304 have exactly the same functions, specifically including: perform the time-delayed conjugate multiplication to $x_n$ and store the multiplication result on the sequence storage module; determine sequences stored on the sequence storage module and compensate phases thereof; accumulate the determination-compensation results and average them to obtain an average value thereof and output the average value to the phase obtainment apparatus to obtain a phase; and multiply the phase with $K_i$ to obtain a carrier frequency offset estimate to be output by the corresponding carrier frequency offset estimation apparatus, wherein $K_i$ is equal to $F_s/(2\pi D_i)$, $F_s$ is the rate of the preamble, and $D_i$ is the delay parameter of the i-th frequency offset estimation apparatus.

Embodiment 4

This embodiment provides an apparatus for carrier frequency offset estimation, which includes:

a time-delayed conjugate multiplication module 401, a sequence storage module 402, a determination-compensation module 403, an accumulator 404, a phase obtainment apparatus 405 and a multiplication module 406, wherein the time-delayed conjugate multiplication module 401 is configured to perform a time-delayed conjugate multiplication to $x_n$ and store the obtained sequence $y_n$ on the sequence storage module 402;

the sequence storage module 402 is configured to receive the multiplication result, namely the sequence $y_n$, from the time-delayed conjugate multiplication module 401 and store it.

the determination-compensation module 403 is configured to determine sequences stored on the sequence storage module 402 and compensate phases thereof;

the accumulator 404 is configured to accumulate the determination-compensation results and average them;

the phase obtainment apparatus 405 is configured to receive outputs from the accumulator to obtain a phase and adjust the phase into a range of $(-\pi/2,\pi/2)$ by adding or subtracting $\pi$ thereto or therefrom; and the multiplication module 406 is configured to multiply the phase with $K_i$ to obtain a carrier frequency offset estimate and output the carrier frequency offset estimate with a corresponding carrier frequency offset estimation apparatus, where $K_i$ is equal to $F_s/(2\pi D_i)$, $F_s$ is the rate of the preamble, and $D_i$ is the delay parameter of the i-th frequency offset estimation apparatus.

Embodiments of the apparatus and system of the present disclosure correspond exactly to those of the method of the present disclosure. Therefore, you can get reference to description on the counterpart of the embodiments of the method whenever you find the description on somewhere of embodiments of the apparatus or system is not sufficient.

Above described are nothing but several ways to carry out embodiments of the present invention. Those skilled in the art can make various variations and modifications to the embodiments without departing from the spirit or scope of the present invention. Thus, it shall be appreciated that the scope of the present invention shall not be limited to the embodiments and it is intended that the scope of the present invention is solely defined by the appended claims.

What is claimed is:

1. A method for carrier frequency offset estimation, comprising:

receiving, by a correlator, a preamble sequence $r_n$, and correlating the preamble sequence $r_n$ with a locally stored Barker code $b_n$ to obtain a calculation result $c_n$;

extracting peak values from every L points in $c_n$ to form a sequence $x_n$, L being a length of a Barker code that corresponds to a sampling rate;

performing frequency offset estimation to $x_n$ through at least two frequency offset estimation apparatuses to obtain corresponding frequency offset estimates, the at least two frequency offset estimation apparatuses adopting different delay parameters D; and inputting the results output from the at least two frequency offset estimation apparatuses into a frequency offset combination module to calculate a final carrier frequency offset estimate.

2. The method according to claim 1, wherein performing frequency offset estimation to $x_n$ through at least two frequency offset estimation apparatuses to obtain corresponding frequency offset estimates, the at least two frequency offset estimation apparatuses adopting different delay parameters D, comprises:

performing a time-delayed conjugate multiplication to $x_n$ to obtain a sequence $y_n$, and storing the sequence $y_n$ on a sequence storage module;

determining the sequences stored on the sequence storage module and compensating phases thereof;

accumulating the determined and compensated results, and averaging them to obtain an average value thereof, and outputting the average value to a phase obtainment apparatus to obtain a phase, and adjusting the phase into a range of $(-\pi/2, \pi/2)$ by adding or subtracting $\pi$ thereto or therefrom; and multiplying the phase with $K_i$ to obtain a carrier frequency offset estimate to be output by a corresponding carrier frequency offset estimation apparatus, where $K_i = F_s/(2\pi D_i)$; $F_s$ is the rate of the preamble; and $D_i$ is the delay parameter of the i-th frequency offset estimation apparatus.

3. The method according to claim 2, wherein determining the sequences stored on the sequence storage unit and compensating phases thereof comprises:

obtaining components $$\sum_n |I_n|^2 \text{ and } \sum_n |Q_n|^2$$

by calculating energies of $I_n$ and $Q_n$ which are real and imaginary parts of $y_n$, respectively, and performing a symbol determination based on the component having a greater energy, so as to obtain a determined modulation sequence, $$\hat{q}_n = \begin{cases} \text{sign}(I_n) & \text{if } \sum_n |I_n|^2 > \sum_n |Q_n|^2 \\ \text{sign}(Q_n) & \text{if } \sum_n |I_n|^2 \leq \sum_n |Q_n|^2, \end{cases}$$

where sign(·) stands for a sign function, and $y_n$ is the sequence obtained by conjugate multiplying the sequence $x_n$ with a sequence obtained through delaying the sequence $x_n$ by D sample values.

4. The method according to claim 1, wherein inputting the results output from the at least two frequency offset estimation apparatuses into a frequency offset combination module to calculate a final carrier frequency offset estimate comprises:

if the number of frequency offset estimation apparatuses is N and the delay parameter of the N-th frequency offset estimation apparatus is greater than that of the (N−1)-th frequency offset estimation apparatus, then the carrier frequency offset estimate is calculated by using the formula $F = F_N + Idx * F_{M,N}$, wherein $Idx = \text{round}((F_{N-1} - F_N)/F_{M,N})$; round(·) stands for a round function; $F_N$ is the carrier frequency offset estimate output by the N-th frequency offset estimation apparatus; $F_{N-1}$ is the carrier frequency offset estimate output by the (N−1)-th frequency offset estimation apparatus; and $F_{M,N}$ is the frequency ambiguity of the N-th frequency offset estimation apparatus;

if there exists no other frequency offset estimation apparatus, F will be regarded as the final carrier frequency offset estimate; or if there exists one or more frequency offset estimation apparatuses having an order number smaller than N−1, namely the (N−2)-th frequency offset estimation apparatus and so on, F will be regarded as an accurately calibrated estimate $F_{N-1}$ of the (N−1)-th frequency offset estimation apparatus and will be further processed with the estimate $F_{N-2}$ of the (N−2)-th frequency offset estimation apparatus according to the above formulae, the above process being repeated until the frequency offset estimation apparatus with the smallest order number is reached, the correspondingly obtained carrier frequency offset estimate F being regarded as the final carrier frequency offset estimate.

5. A system for carrier frequency offset estimation, comprising:

a correlator (301), a peak value extraction module (302), a first frequency offset estimation module (303), a second frequency offset estimation module (304) and a frequency offset combination module (305), wherein the correlator (301) is configured to receive a preamble sequence $r_n$, and correlate the preamble sequence $r_n$ with a locally stored Barker code $b_n$ to obtain a calculation result $c_n$;

the peak value extraction module (302) is configured to extract peak values from every L points in $c_n$ and form a peak value sequence $x_n$, L being a length of a Barker code that corresponds to the sampling rate;

the first frequency offset estimation module (303) is configured to receive $x_n$ and calculate a corresponding carrier frequency offset estimate;

the second frequency offset estimation module (304) is configured to receive $x_n$ and calculate another corresponding carrier frequency offset estimate;

the frequency offset combination module (305) is configured to receive the results output from the first frequency offset estimation module (303) and the second frequency offset estimation module (304), and calculate a final carrier frequency offset estimate, wherein the first and second frequency offset estimation modules adopt different delay parameters D.

6. The system according to claim 5, wherein the first frequency offset estimation module (303) and the second frequency offset estimation module (304) are configured to perform a time-delayed conjugate multiplication to $x_n$ to obtain a sequence $y_n$, and store the sequence $y_n$ on a sequence storage module; determine and compensate sequences stored on the sequence storage module; accumulate the determined and compensated results and average them to obtain an average value thereof and output the average value to a phase obtainment apparatus to obtain a phase; and multiply the phase with $K_i$ to obtain a carrier frequency offset estimate of a corresponding frequency offset estimation apparatus, where $K_i = F_s/(2\pi D_i)$, $F_s$ is the rate of the preamble, and $D_i$ is the delay parameter of the i-th frequency offset estimation apparatus.

7. An apparatus for carrier frequency offset estimation, comprising:

a time-delayed conjugate multiplication module (401), a sequence storage module (402), a determination-compensation module (403), an accumulator (404), a phase obtainment apparatus (405) and a multiplication module (406), wherein the time-delayed conjugate multiplication module (401) is configured to perform a time-delayed conjugate multiplication to $x_n$ to obtain a sequence $y_n$ and store the sequence $y_n$ on the sequence storage module (402);

the sequence storage module (402) is configured to receive the sequence $y_n$ from the time-delayed conjugate multiplication module (401) and store it;

the determination-compensation module (403) is configured to determine sequences stored on the sequence storage module (402) and compensate phases thereof;

the accumulator (404) is configured to accumulate the determination-compensation results and average them;

the phase obtainment apparatus (405) is configured to receive outputs from the accumulator to obtain a phase and adjust the phase into a range of $(-\pi/2, \pi/2)$ by adding or subtracting $\pi$ thereto or therefrom; and the multiplication module (406) is configured to multiply the phase with $K_i$ to obtain a carrier frequency offset estimate and output the carrier frequency offset estimate by a corresponding carrier frequency offset estimation apparatus, where $K_i=F_s/(2\pi D_i)$, $F_s$ is the rate of the preamble, and $D_i$ is the delay parameter of the i-th frequency offset estimation apparatus.

* * * * *